(12) United States Patent
Grybauskas et al.

(10) Patent No.: US 12,499,172 B1
(45) Date of Patent: Dec. 16, 2025

(54) WEBSITE GENERATION USING LANGUAGE MODELS

(71) Applicant: HOSTINGER operations, UAB, Vilnius (LT)

(72) Inventors: Andrius Grybauskas, Kaunas (LT); Arminas Maciulskas, Kaunas (LT); Tomas Rasymas, Kaunas (LT)

(73) Assignee: HOSTINGER operations, UAB, Vilnius (LT)

(*) Notice: Subject to any disclaimer, the term of this patent is extended or adjusted under 35 U.S.C. 154(b) by 0 days.

(21) Appl. No.: 19/255,093

(22) Filed: Jun. 30, 2025

Related U.S. Application Data

(63) Continuation of application No. 19/042,542, filed on Jan. 31, 2025.

(51) Int. Cl.
*G06F 17/00* (2019.01)
*G06F 16/958* (2019.01)

(52) U.S. Cl.
CPC .................. *G06F 16/958* (2019.01)

(58) Field of Classification Search
CPC .................................................. G06F 16/958
See application file for complete search history.

(56) References Cited

U.S. PATENT DOCUMENTS

| | | | | |
|---|---|---|---|---|
| 9,396,183 B2 * | 7/2016 | Barbosa | ................ | G06F 40/205 |
| 11,853,728 B2 * | 12/2023 | Kol | ........................ | G06F 16/986 |
| 12,182,506 B2 * | 12/2024 | Saxena | .................... | G06F 40/20 |
| 12,332,965 B1 * | 6/2025 | Parasnis | ............. | G06Q 30/0271 |
| 12,346,387 B2 * | 7/2025 | Chrysanthou | ...... | G06Q 30/0277 |
| 2013/0297716 A1 * | 11/2013 | Spittle | ...................... | G06F 21/41 709/212 |
| 2013/0332819 A1 * | 12/2013 | Avritch | ................... | G06Q 10/10 715/234 |
| 2014/0331124 A1 * | 11/2014 | Downs | .................. | G06F 40/106 715/243 |
| 2015/0106078 A1 * | 4/2015 | Chang | ..................... | G06F 16/35 704/9 |
| 2015/0264156 A1 * | 9/2015 | De Alwis | ................ | H04L 67/02 709/203 |
| 2016/0124980 A1 * | 5/2016 | Sinha | .................... | G06F 16/958 715/745 |

(Continued)

FOREIGN PATENT DOCUMENTS

| | | | | | |
|---|---|---|---|---|---|
| CN | 106406893 A | * | 2/2017 | ........... | G06F 16/958 |
| CN | 113360821 B | * | 8/2023 | ........... | G06F 16/972 |

(Continued)

*Primary Examiner* — Laurie A Ries
(74) *Attorney, Agent, or Firm* — Young Basile Hanlon & MacFarlane, P.C.

(57) ABSTRACT

Generating a website includes receiving a brand name and a website description. User preferences are extracted from the website description using a language model. A website structure including pages and sections is determined based on the user preferences using the language. Website content for the pages and the sections are generated using the language model based on the brand name and the website description. The website structure and the website content are assembled into a data structure representing a hierarchical arrangement of the pages and the sections. The data structure is rendered as a browser-compatible website.

20 Claims, 14 Drawing Sheets

(56) References Cited

U.S. PATENT DOCUMENTS

| | | | | |
|---|---|---|---|---|
| 2017/0161253 | A1* | 6/2017 | Silver | H04L 67/289 |
| 2019/0266225 | A1* | 8/2019 | Solis | G06F 16/972 |
| 2020/0342049 | A1* | 10/2020 | Carter | G06F 3/0484 |
| 2020/0380060 | A1* | 12/2020 | Siani Cohen | G06N 3/08 |
| 2023/0359958 | A1* | 11/2023 | Harding | G06F 8/20 |
| 2024/0281475 | A1* | 8/2024 | Chrysanthou | G06F 40/186 |
| 2024/0289411 | A1* | 8/2024 | Chrysanthou | G06F 16/951 |
| 2024/0386197 | A1* | 11/2024 | Perez | G06F 9/547 |
| 2024/0386216 | A1* | 11/2024 | Sodhi | G06F 40/40 |
| 2024/0419706 | A1* | 12/2024 | Gutierrez | G06F 40/166 |
| 2025/0231999 | A1* | 7/2025 | Siani Cohen | G06F 11/3438 |

FOREIGN PATENT DOCUMENTS

| | | | | |
|---|---|---|---|---|
| CN | 118861463 A | * | 10/2024 | G06F 40/279 |
| WO | WO-2023002366 A1 | * | 1/2023 | G06V 10/774 |
| WO | WO-2025042852 A1 | * | 2/2025 | G06F 40/186 |
| WO | WO-2025063948 A1 | * | 3/2025 | G06F 16/957 |

* cited by examiner

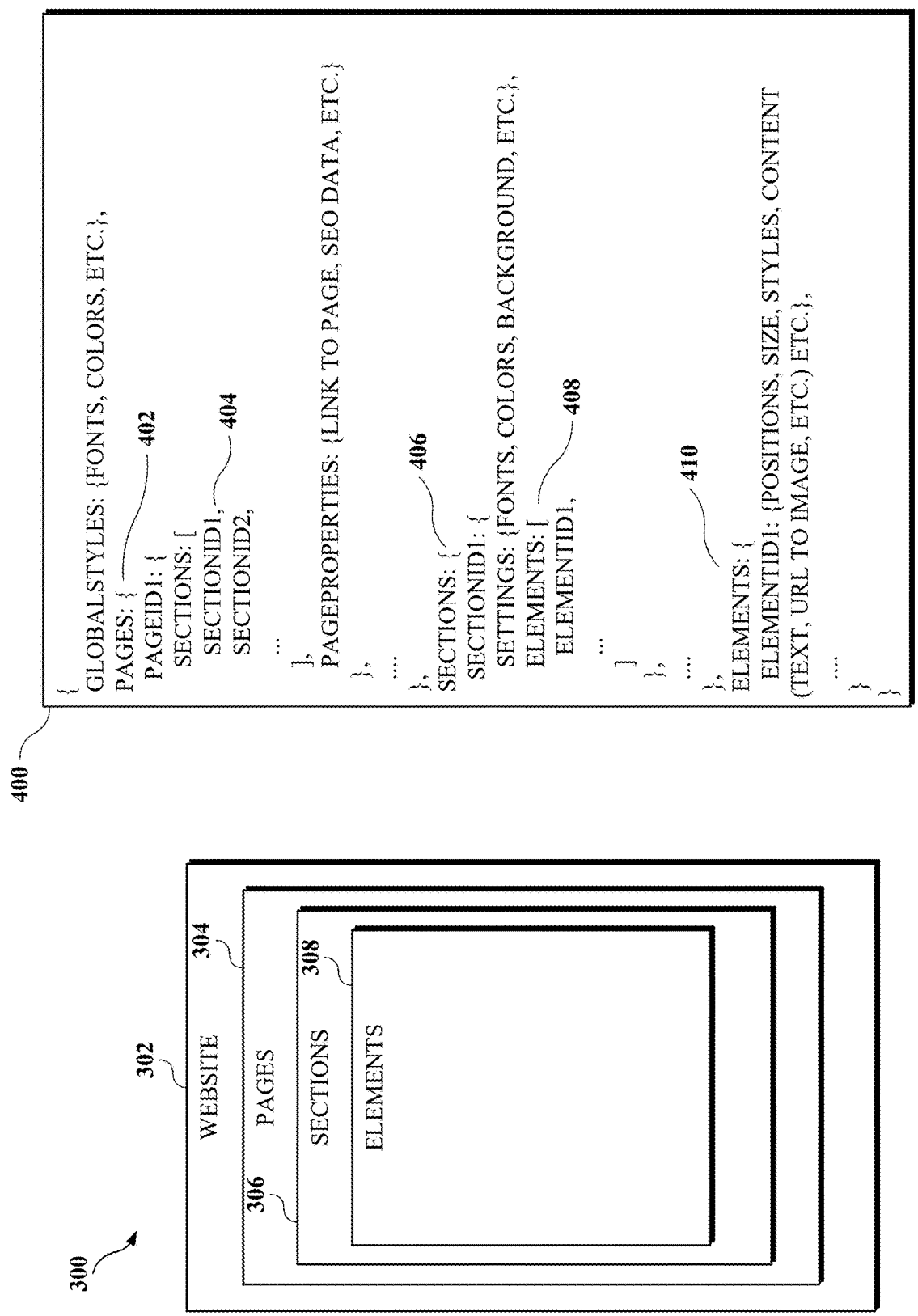

602

HERE IS THE WEBSITE DESCRIPTION: {{WEBSITE_DESCRIPTION}}. ~ 606

YOUR TASK IS TO REPORT WHETHER IN THE WEBSITE DESCRIPTION THERE IS ANYTHING MENTIONED ABOUT WHAT SPECIFIC COLORS OR FONTS TO USE ON THE WEBSITE.

IF THE DESCRIPTION MENTIONS SPECIFIC TYPES OR STYLES OF FONTS TO USE, RETURN TRUE; OTHERWISE, RETURN FALSE.

IF THE DESCRIPTION MENTIONS SPECIFIC COLORS TO USE, RETURN TRUE; OTHERWISE, RETURN FALSE.

PROVIDE THE TRUE OR FALSE VALUE ONLY AND DO NOT WRITE ANY ADDITIONAL TEXT IN THE JSON OUTPUT.

⎫ 608

OUTPUT JSON FORMAT:
{
"ISCOLORMENTIONED": CHOOSE TRUE OR FALSE DEPENDING ON IF A SPECIFIC COLOR WAS MENTIONED,
"ISFONTMENTIONED": CHOOSE TRUE OR FALSE DEPENDING ON IF A SPECIFIC FONT WAS MENTIONED
}

⎫ 610

604

HERE IS ALL THE LIST OF SUPPORTED WEBSITE TYPES: {{ALL_WEBSITE_TYPES}}. ~ 612

HERE IS THE USER PROMPT: {{WEBSITE_DESCRIPTION}}. ~ 614

HERE IS THE USER BRAND NAME: {{BRAND_NAME}}. ~ 616

USING THE USER PROMPT AND BRAND NAME, SELECT THE MOST APPROPRIATE WEBSITE_TYPE. ~ 618

OUTPUT JSON FORMAT:
{"WEBSITE_TYPE": "SELECT ONE WEBSITE TYPE THAT BEST REPRESENT THE USER PROMPT"} ~ 620

FIG. 6

YOUR TASK IS TO GENERATE A SINGLE OR MULTIPLE WEBSITE PAGE NAME OR NAMES FOR A WEBSITE BASED ON THE USER-PROVIDED WEBSITE_TYPE, AND WEBSITE_DESCRIPTION.

USER DATA: WEBSITE_TYPE: {{WEBSITE_TYPE}}, WEBSITE_DESCRIPTION: {{WEBSITE_DESCRIPTION}}.

RULES TO FOLLOW:
1. GENERATE WEBSITE PAGE NAME OR NAMES THAT REPRESENT USER WEBSITE_DESCRIPTION.
2. MAKE SURE THAT THE WEBSITE NAMES ARE GENERAL, AVOID MAKING THEM TOO SPECIFIC.
3. GENERATE EXACTLY 4 WEBSITE PAGE NAMES UNLESS WEBSITE_DESCRIPTION SAYS OTHERWISE.
4. FIRST PAGE MUST BE HOME PAGE.
5. USE LOWERCASE LETTERS FOR THE PAGE NAME OR NAMES AND REMOVE ANY UNDERSCORES OR SLASHES.
6. WEBSITE PAGE NAMES SHOULD BE ONLY ONE OR TWO WORDS. AVOID USING THREE WORD PAGE NAMES.
7. ENSURE THAT THE PAGE NAME OR NAMES ARE IN THE FOLLOWING LANGUAGE: {{LANGUAGE}}.
8. IF WEBSITE_DESCRIPTION MENTIONS BLOG ADD BLOG PAGE.

OUTPUT WEBSITE PAGE NAME OR NAMES IN JSON FORMAT:
{"WEBSITE_PAGE_NAMES": ["CLOSELY FOLLOW THE RULES AND GENERATE PAGE NAME OR A LIST OF PAGE NAMES"]}

FIG. 9B

YOU HAVE THE FOLLOWING WEBSITE PAGES: {{PAGE_NAMES}}. YOUR JOB IS TO FILL EACH WEBSITE PAGE WITH THE MOST APPROPRIATE SECTIONS FROM THE GIVEN LIST THAT BEST REPRESENT USER WEBSITE_DESCRIPTION.

HERE IS THE WEBSITE_DESCRIPTION: {{WEBSITE_DESCRIPTION}}.

RULES TO FOLLOW:
1. FOR EACH PAGE SELECT THE MOST APPROPRIATE SECTIONS FROM THE FOLLOWING SECTION_LIST: {{SECTIONS}}.
2. NEVER LEAVE EMPTY PAGE WITHOUT A SECTION.
3. "HERO" RELATED SECTIONS CAN BE USED ONLY ON THE FIRST PAGE. DONT USE IT ON OTHER PAGES.
4. FOR FIRST PAGE YOU MUST INCLUDE A HERO AND BLOG_POSTS SECTIONS.
5. IF THERE IS A MENU PAGE YOU MUST ADD "FOOD-MENU" SECTION.
6. DO NOT PLACE IDENTICAL SECTIONS CONSECUTIVELY ON ANY PAGE.
7. YOU MUST ADD BLOG-POSTS IN ALL SECTIONS.
8. FOCUS MORE ON ADDING GALLERY SECTION FOR ADDITIONAL PAGES, UNLESS USERS SAYS IT SELL PRODUCTS.

OUTPUT IN JSON FORMAT: {{JSON_FORMAT}}

FIG. 9C

BASED ON THE PROVIDED {{POST_TYPE}} CONTENT, SUGGEST TAGS, CATEGORY, SEO KEYWORDS, AND A META DESCRIPTION.
CONTENT: {{CONTENT}}

OUTPUT FORMAT SHOULD BE JSON WITHOUT ANY MARKDOWN FORMATTING, USING THE FOLLOWING STRUCTURE:
{
 "TAGS": ["<LIST OF 3 WORDPRESS {{POST_TYPE}} TAGS IN {{LANGUAGE}}>"],
 "CATEGORY": "<WORDPRESS {{POST_TYPE}} CATEGORY IN {{LANGUAGE}}>",
 "SEO_KEYWORDS": ["<5 SEO KEYWORDS IN {{LANGUAGE}}>"],
 "META_DESCRIPTION": "<META DESCRIPTION IN {{LANGUAGE}} ABOUT 150 WORDS IN LENGTH>"
}

ENSURE THAT THE OUTPUT IS IN RAW JSON FORMAT, WITHOUT WRAPPING IT IN TRIPLE BACKTICKS OR ANY OTHER FORMATTING.

FIG. 9D

WEBSITE GENERATION USING LANGUAGE MODELS

CROSS REFERENCE TO RELATED APPLICATIONS

This application is a continuation of U.S. patent application Ser. No. 19/042,542, filed Jan. 31, 2025, the entire disclosure of which is incorporated herein by reference.

FIELD

This disclosure generally relates to website builders, and, more specifically, to generating a website using language models.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 illustrates a hierarchical structure 300 for generating websites by a Website Assembly with Large Language Models (WALLM) software.

FIG. 4 illustrates a data structure generated by a WALLM software.

FIG. 6 illustrates examples of prompts that the user preferences extraction service of FIG. 5 may use.

FIGS. 9B, 9C, and 9D illustrate prompts usable by the structure generation service of FIG. 5.

DETAILED DESCRIPTION

Figure 1:
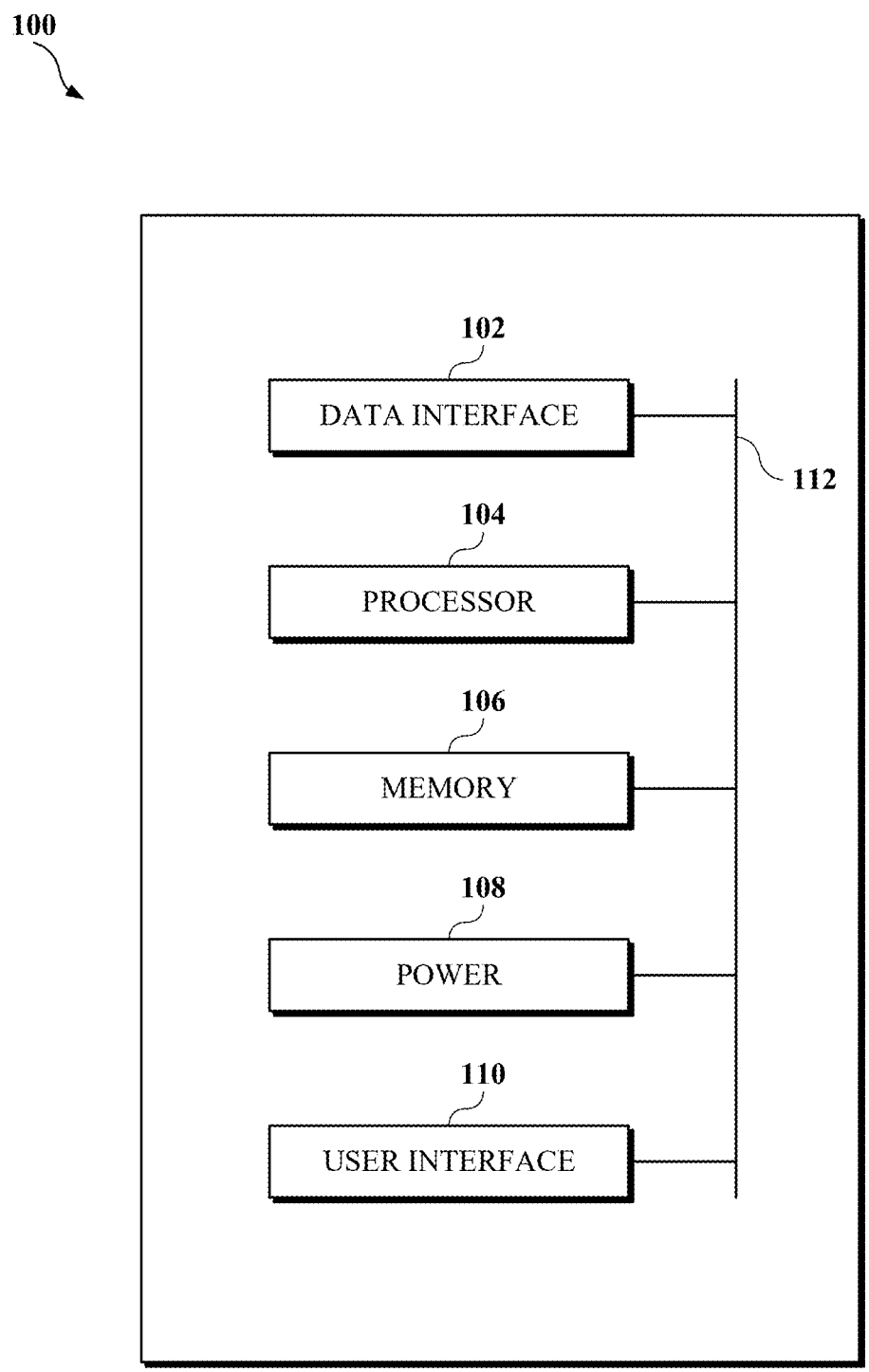
FIG. 1 is a block diagram of an example of a computing device.

Website builders are digital platforms that enable individuals and businesses to create professional online presences without requiring extensive coding knowledge or design expertise. These platforms typically offer user-friendly interfaces with drag-and-drop functionality, making website creation accessible to users of all skill levels. Beyond basic website creation, these tools often provide comprehensive solutions including domain registration, hosting services, search engine optimization (SEO) tools, and mobile optimization capabilities. More advanced platforms may also include features such as analytics integration, third-party app connectivity, and e-commerce functionality.

Traditional website builders follow a template-based approach to website creation. Users typically begin by selecting from a rigid set of pre-designed templates that include predefined page structures, sections, and design elements. These templates generally offer configurable components such as navigation menus, text blocks, image galleries, and contact forms, along with customizable color themes and typography settings. Users interact with these builders through visual interfaces to add, remove, or rearrange components within the constraints of their chosen template.

However, conventional website builders suffer from significant limitations that can impact the quality and efficiency of website creation. The template-based approach often results in generic, formulaic websites that lack distinctive character and fail to effectively capture brand identity. Users must invest considerable time in manually configuring design elements, generating content, and optimizing for search engines. The process is labor-intensive, requiring users to make numerous detailed decisions about layout, design, and content placement. These systems particularly struggle when user requirements are complex or nuanced, potentially resulting in websites that fail to effectively balance aesthetics with usability. Website creation remains time-consuming and often requires users to possess a combination of design, content writing, and technical skills to achieve professional results. Moreover, the rigid template structures can significantly limit creative freedom and result in websites that lack authentic personalization. The extensive manual intervention required at every step—from content creation to design refinement and search engine optimization (SEO) optimization—makes it challenging for users to efficiently create websites that truly stand out in today's competitive digital landscape.

Implementations according to this disclosure solve problems such as these by providing a Website Assembly with Large Language Models (WALLM) software that automates the website creation process by systematically generating website structure, content, and design elements using one or more language models (such as a large language model (LLM)) to minimize manual user input. The WALLM minimizes the need for extensive user input, typically requiring only a brand name and a brief description.

The WALLM utilizes advanced language model prompting to intelligently extract user preferences, generate tailored content, and make data-driven design decisions. When user preferences are incomplete or ambiguous, the WALLM autonomously generates suitable defaults aligned with industry standards and best practices, such as placing hero sections (which typically display company names and key imagery) at the top of pages, positioning contact forms at the bottom, and selecting appropriate page types based on business categories. For example, the WALLM may determine that an e-commerce business requires product listing pages, while a restaurant website needs menu pages. The WALLM also applies conventional design principles for unspecified visual elements, such as ensuring color scheme cohesion and maintaining logical content hierarchy, to produce professional results even with minimal user direction The resulting websites are logically structured, populated with relevant and engaging content, visually cohesive, and optimized for search engine performance-all without manual involvement in design, content creation, or SEO optimization. This automated process dramatically accelerates website development, improves accessibility for users without technical expertise, and ensures the final product is both professionally crafted and purpose-driven.

To describe some implementations in greater detail, reference is first made to examples of hardware and software structures used to implement website generation using language models. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hard-wired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
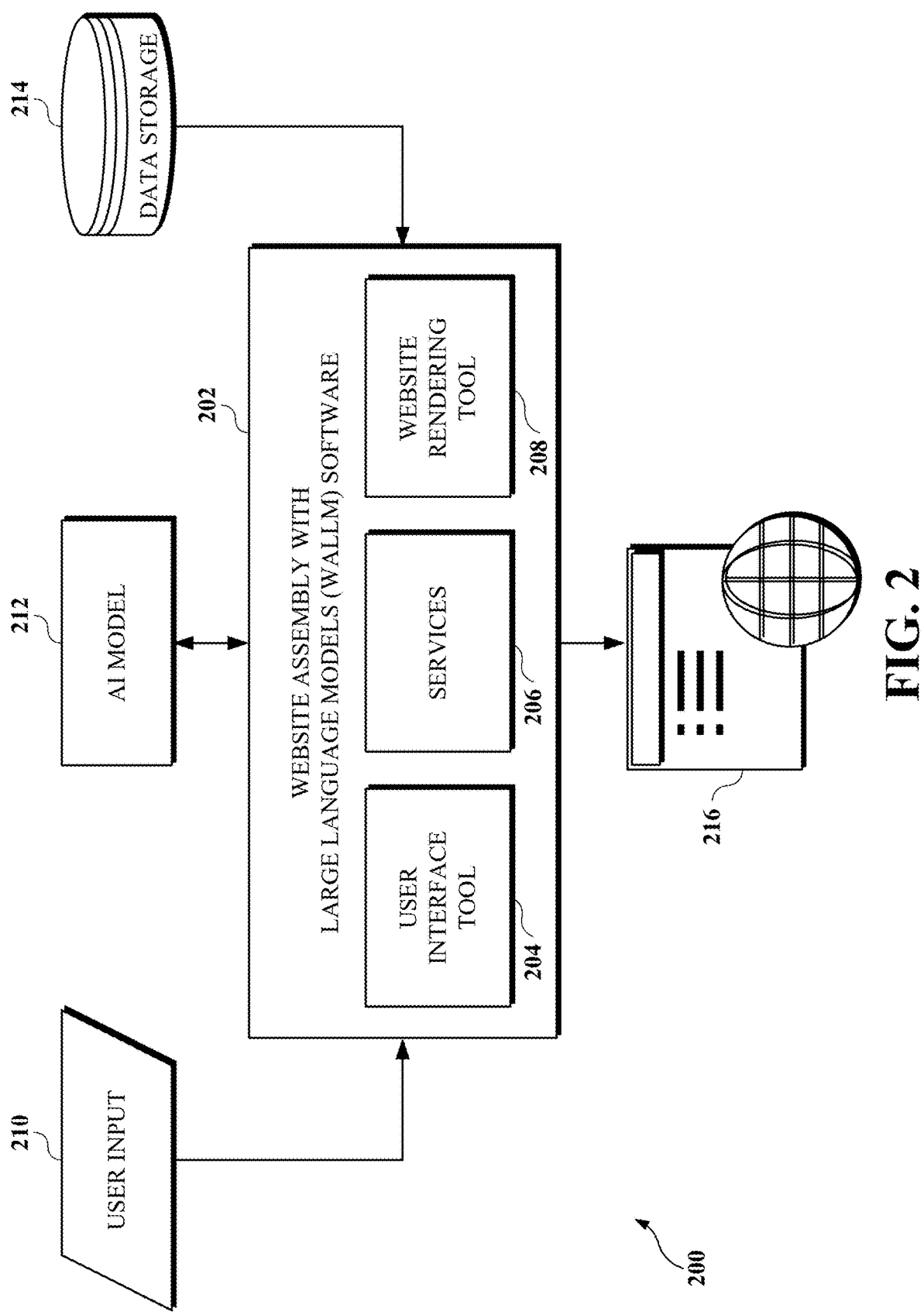
FIG. 2 is a block diagram of a system 200 for generating websites using language models.

FIG. 2 is a block diagram of a system 200 for generating websites using language models. The system 200 includes a WALLM software 202, which includes tools, such as programs, subprograms, functions, routines, subroutines, operations, executable instructions, and/or the like for, inter alia, generating websites from user input using language models, as further described below.

To generate a website means to create all necessary components including the website's structure, content, styling, and functionality, resulting in a complete, functioning website represented by a hierarchical internal data structure that includes page objects, section objects, and element objects, which are rendered into a browser-compatible format for end-user access. The WALLM software 202 automates this process by using a language model (e.g., one or more language models or LLMs) to interpret user requirements and generate appropriate website elements while maintaining professional standards and best practices, streamlining the website creation process with minimal user effort.

At least some of the tools of the WALLM software 202 can be implemented as respective software programs that may be executed by one or more computing devices, such as the computing device 100 of FIG. 1. A software program can include machine-readable instructions that may be stored in a memory, such as the memory 106 of FIG. 1, and that, when executed by a processor, such as the processor 104 of FIG. 1, may cause the computing device to perform the instructions of the software program. As shown, the WALLM software 202 includes a user interface tool 204, a set of services 206, and a website rendering tool 208. In some implementations, the WALLM software 202 can include more or fewer tools. In some implementations, some of the tools may be combined, some of the tools may be split into more tools, or a combination thereof The user interface tool 204 receives user input 210 from which to generate a website (e.g., the structure of a website). The user input 210 minimally includes a brand name and a website description. The brand name represents the business, organization, or individual identity associated with the website (e.g., "Ocean Clean" for a non-profit organization or "TechPro" for a technology firm). The website description provides contextual information about the website's purpose, target audience, and design preferences in natural language form (e.g., "A landing page for a marketing agency based in London specializing in digital campaigns. Our team has over ten years of experience delivering exceptional results."). The user input 210 may optionally include explicit preferences for colors, fonts, layout structure, specific desired functionalities, or content style (e.g., "We prefer modern designs with blue colors. Our standard typography in marketing materials is Helvetica Neue."). In some examples, the user input 210 may also include a website type (e.g., 'online store' for e-commerce sites, 'portfolio' for designers showcasing work, 'landing page' for marketing campaigns, or 'business showcase' for company websites).

The user interface tool 204 also provides interactive interfaces through which users can refine and customize the generated website. For example, users can modify generated content, replace selected images, adjust color schemes, rearrange sections, add new pages through an intuitive interface, or configure specific sections or elements. To illustrate, with respect to a contact form (that enables website visitors to submit inquiries or feedback to the website owner), the user can provide the email address to which submitted form responses are sent. As another illustration, the user may replace a generated or selected image with an image uploaded from their local device. The user interface tool 204 may also provide suggestions and alternatives based on the user's preferences and industry standards. These refinements are seamlessly integrated into the website structure by the services 206.

An artificial intelligence (AI) model 212 can be used by the WALLM software 202 to generate websites or components therefor. While the AI model 212 is mainly described herein as a language model, the disclosure herein is not so limited. The AI model 212 can be or include one or more language models (e.g., LLMs) for natural language understanding and content generation, image generation models for creating custom website graphics and visual elements, computer vision models for image analysis and processing, and/or other specialized AI models as needed for specific website generation tasks. For example, language models may generate website content and structure, image generation models may create custom graphics and backgrounds, and computer vision models may analyze and optimize uploaded images. Such AI models can be integrated within the WALLM software 202 or accessed by the WALLM software 202 as external services via APIs.

The language models within AI model 212, such as LLMs, are capable of natural language understanding and generation. A language model (e.g., an LLM) is a type of artificial intelligence model trained on, typically, vast amounts of text data to understand and generate human-like text, extract meaning from text, and perform various language-related tasks such as content generation and preference extraction. In some implementations, the AI model 212 can be integrated within the WALLM software 202, while in other implementations it can be accessed as an external service via an API or network connection. The WALLM software 202 may also include its own specialized language models trained for specific website generation tasks alongside or instead of external language models.

Typical interactions with a language model involve providing prompts, which are user inputs or system-generated queries, to elicit specific responses or content completions. User-provided prompts may include or be based on website descriptions or customization requests, while system-generated queries can be automatically formulated by the WALLM software 202 to refine or expand incomplete user input. These system-generated prompts may leverage contextual data or previous user interactions to generate more accurate and relevant website components.

In the context of the WALLM software 202, prompts may include user-provided website descriptions, brand information, or configuration commands that guide the AI model 212 in generating relevant website components, such as section layouts, text content, and image selections. Few-shot examples—which consist of a limited set of input-output pairs—may be included in the prompts to demonstrate the desired style, tone, or format of generated content. For instance, the services 206 may provide a few sample product descriptions or layout configurations, enabling the AI model 212 to generate additional content that mirrors the same structure, tone, or formatting across the website. For example, a few-shot prompt might include examples of preferred headline formats or product descriptions, enabling the model to replicate similar content throughout the website.

It is noted that the disclosure herein includes certain illustrative prompts provided to facilitate understanding. However, the disclosure is not limited to the specific prompts described herein. Variations, modifications, and additional prompts may be utilized without departing from the scope of the disclosure. Furthermore, alternative prompts or configurations may be employed to achieve similar or enhanced functionality, depending on implementation requirements. The prompts described are merely examples, and other prompts or combinations thereof may be used to optimize performance, improve user interaction, or expand system capabilities.

The data storage 214, which can be one or more data stores, contains various pre-defined resources usable for website generation, including section templates, color palettes, font collections, and image databases. This data is accessed by the services 206 to match user preferences or provide default selections when user input is incomplete. The data storage 214 also stores the internal data structures representing generated websites, including page objects, section objects, and element objects with their respective positioning data, along with associated metadata such as SEO data and configuration settings for future retrieval and editing.

The services 206 orchestrate the website generation process by coordinating interactions between the user input 210, the AI model 212, and the data storage 214. The services 206 perform multiple tasks including: extracting explicit user preferences from the website description using the AI model 212; generating implicit preferences based on industry standards when the input is vague; determining website structure including pages and sections; generating website content; selecting appropriate images; and determining color schemes and typography. These components are processed in parallel to optimize generation speed and reduce latency, and are then assembled into an internal data structure representing a hierarchical arrangement of the website's pages and sections. The set of services 206 is further described with respect to FIG. 5.

The website rendering tool 208 serves two primary purposes. First, it enables users to preview their website in real-time as they make modifications through the user interface tool 204, dynamically updating the website's appearance to reflect all changes. Second, it renders the final website for end-user viewing by converting the internal data structure into a browser-compatible format. This involves loading website components, generating a Document Object Model (DOM), and rendering the DOM in a web browser. Accordingly, the website rendering tool 208 generates webpages 216 based on hierarchical structures that describe the webpages 216 and are stored in the data storage 214. The website rendering tool 208 is further described with respect to FIG. 12.

FIG. 3 illustrates a hierarchical structure 300 for generating websites by a WALLM software, such as the WALLM software 202 of FIG. 2. The hierarchical structure 300 is composed of multiple layers that organize and assemble the various components of a website for efficient generation and rendering.

At the highest level, a website 302 includes one or more web pages 304. Each web page 304 may serve a distinct purpose and may represent different areas of the website 302. For example, a homepage may introduce the brand with featured content, a portfolio page may showcase work examples, an "About Us" page may describe the company's history and team, and a contact page may provide means for user communication. A web page may also function as a step within a multi-page process, such as a checkout flow or multi-step form.

Each web page 304 contains one or more sections 306. Sections represent functional or informational modules that organize content into logical segments. Examples of sections include image galleries, testimonials, contact forms, service descriptions, and navigation menus. The WALLM software accesses, for example, data storage 214 of FIG. 2 to maintain multiple variants of each section type, enabling flexible design options. For instance, a testimonials section could display customer feedback in various formats, such as rotating carousels or static grid layouts. Similarly, a contact form section might have variants with different layouts: the form positioned on the left with an image on the right, the form on the right with an image on the left, or a centered form with descriptive text below.

Within each section 306, multiple elements 308 are embedded as the smallest building blocks of the website. These elements serve as atomic units for constructing functional and aesthetic features, including buttons, images, text fields, videos, icons, and interactive widgets. For example, in a contact form section, the elements could consist of input fields for name and email, a dropdown menu for selecting inquiry types, a larger text area for messages, and a submit button, potentially accompanied by an image element showing a customer service representative.

This hierarchical arrangement—website 302, web pages 304, sections 306, and individual elements 308—enables the WALLM software to generate websites dynamically using a language model, such as the AI model 212 of FIG. 2. The language model interprets user input to determine the appropriate website structure and generates content for each layer of the hierarchy. Specifically, the language model identifies the required pages, selects relevant section types, and produces text, images, and design elements for each section. By leveraging the hierarchical structure, the language model can generate components in a modular manner, allowing independent generation and refinement of pages, sections, and elements. This modularity enables efficient parallel processing, where multiple website components are generated concurrently, significantly reducing website creation time. Additionally, the language model can adaptively generate and integrate content variations-such as different section layouts or content tones-based on user preferences or industry standards, ensuring the final website is cohesive, functional, and professionally designed.

FIG. 4 illustrates a data structure 400 generated by a WALLM software, such as the WALLM software 202 of FIG. 2. The data structure 400 describes or represents a website generated by the WALLM software and that is stored, such as for later rendering, in the data storage 214 of FIG. 2. The data structure 400 organizes and consolidates various website components, integrating outputs from the set of services 206, as further described herein, into a cohesive format for storage and subsequent rendering. The data structure 400 may be or provide an intermediate representation that may not be in conventional web programming languages, such as Hypertext Markup Language (HTML) or Cascading Style Sheets (CSS).

At the highest level, the data structure 400 may include GLOBALSTYLES (e.g., typographical information) containing website-wide styling information such as fonts, colors, and other universal design settings that ensure consistent visual appearance across the entire website. The data structure 400 is organized into PAGES 402, where each PAGEID (page identifier) represents a distinct webpage such as homepages, product pages, contact pages, and about pages. Each page includes SECTIONS 404 (e.g., SECTIONID1, SECTIONID2, etc.) and PAGEPROPERTIES. The PAGEPROPERTIES store page-specific data such as links to other pages and SEO metadata.

The data structure 400 further decomposes into a SECTIONS array 406 that contains detailed information about each actively utilized section within the website. Each section entry, identified by SECTIONID (e.g., section identifier), includes SETTINGS (specifying properties such as fonts, colors, and background configurations) and ELEMENTS (designated by ELEMENTID) 408. Examples of sections include image galleries, testimonials, contact forms, and navigation menus, each with distinct styling and functionality. Sections may contain flagged elements that function as placeholders for specific text content to be generated later.

At the lowest level, the ELEMENTS array 410 contains the atomic building blocks of the website. Each ELEMENTID entry specifies comprehensive element properties including positioning coordinates, dimensional attributes (size), styling parameters, and content data such as text or image URLs. Elements may include buttons, images, text fields, videos, and interactive widgets. For example, in a contact form section, the elements could consist of text input fields, dropdown menus, and a submit button.

Figure 5:
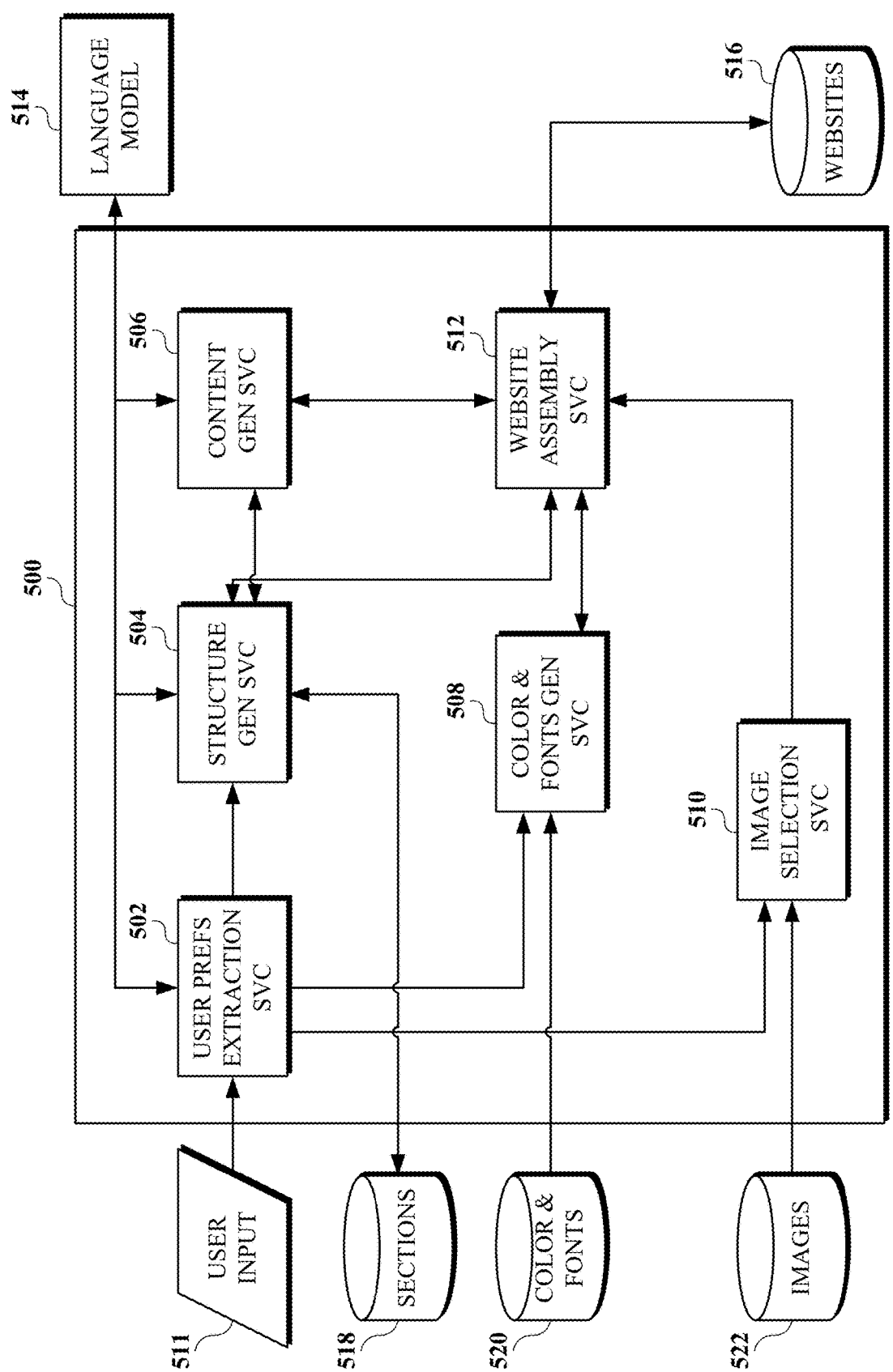
FIG. 5 is a diagram illustrating functionality of services of a WALLM.

FIG. 5 is a diagram illustrating functionality of services 500 of a WALLM, which may be the set of services 206 of FIG. 2. The services 500 is shown as including a user preferences extraction service 502, a structure generation service 504, a content generation service 506, a color and fonts generation service 508, an image selection service 510, and a website assembly service 512.

The user preferences extraction service 502 processes the user input 511, which minimally includes a brand name and website description. The user input 511 may also include a website type. The website description may include inputs including one or more of color preferences, font selections, layout structures, and desired functionalities. The user preferences extraction service 502 employs a language model 514 to analyze the user input 511, extracting explicit preferences and inferring implicit preferences based on industry standards when the user input 511 is incomplete. These extracted preferences are then distributed to other services. In an example, the processing of at least some of the other services may proceed in parallel, as these services function independently of one another. FIG. 6 illustrates examples of prompts that the user preferences extraction service 502 may use.

The structure generation service 504 determines the website's hierarchical organization by interfacing with both the language model 514 and a sections database 518. The structure generation service 504 first checks for any structural preferences specified by the user in the user input 511. If no preferences are provided, the language model 514 is used to predict the website type (e.g., blog, portfolio, e-commerce) based on the provided website description. The identified website type is then used to filter and select the most suitable sections from the sections database 518. Using these filtered sections, the structure generation service 504 constructs a logical website layout, including the strategic placement and ordering of sections within pages to optimize user experience and content flow. FIGS. 9A-9D illustrate operations of the structure generation service 504.

Figure 10:
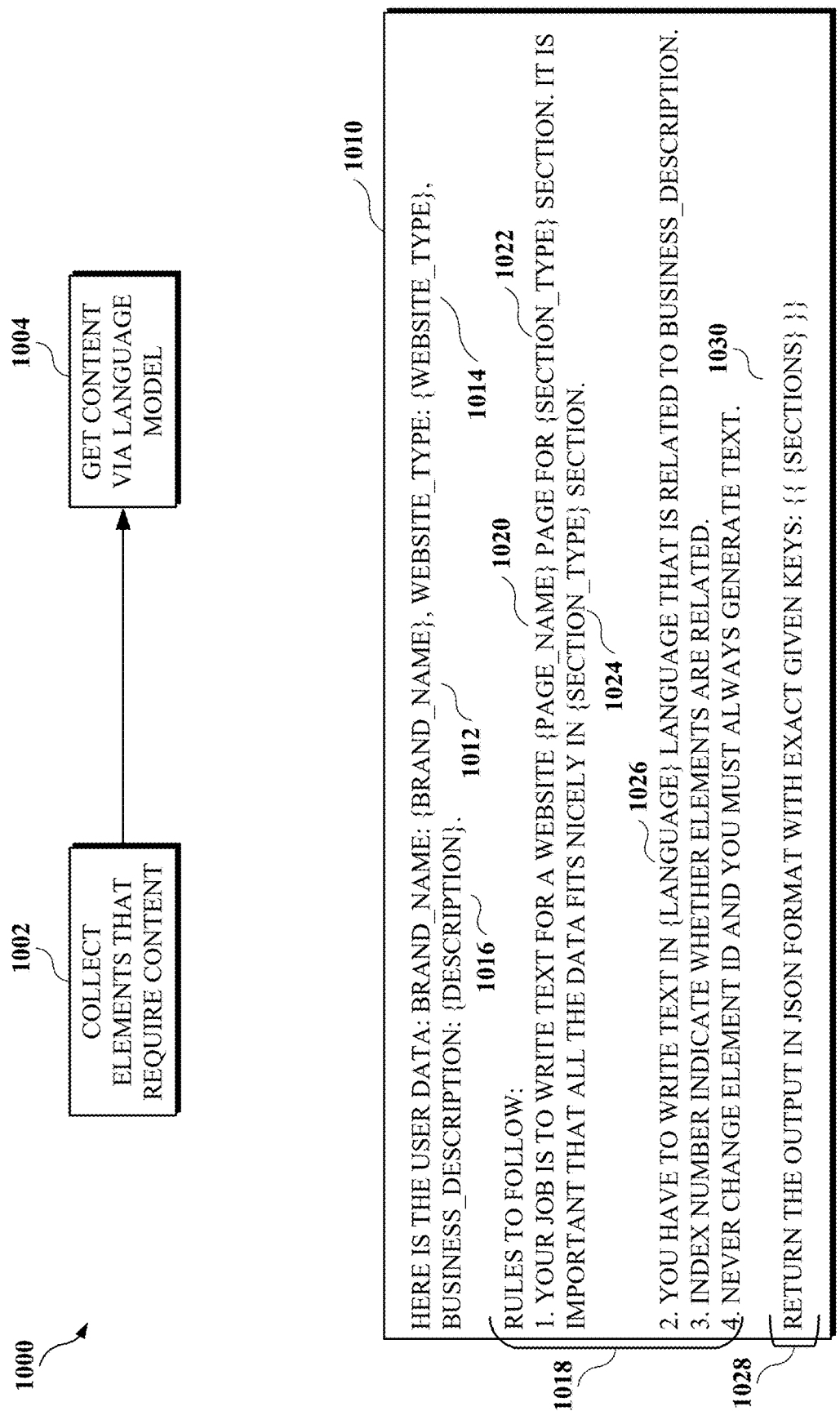
FIG. 10 illustrates operations of the content generation service of FIG. 5.

The content generation service 506 utilizes the language model 514 to create context-aware textual content throughout the website. The content generation service 506 generates various content types including headings, body text, product descriptions, and SEO metadata. The service ensures content consistency by dynamically adapting its output based on the extracted brand identity and target audience information. The generated content maintains a cohesive tone while adhering to industry-specific communication standards. FIG. 10 illustrates operations of the content generation service 506.

Figure 8:
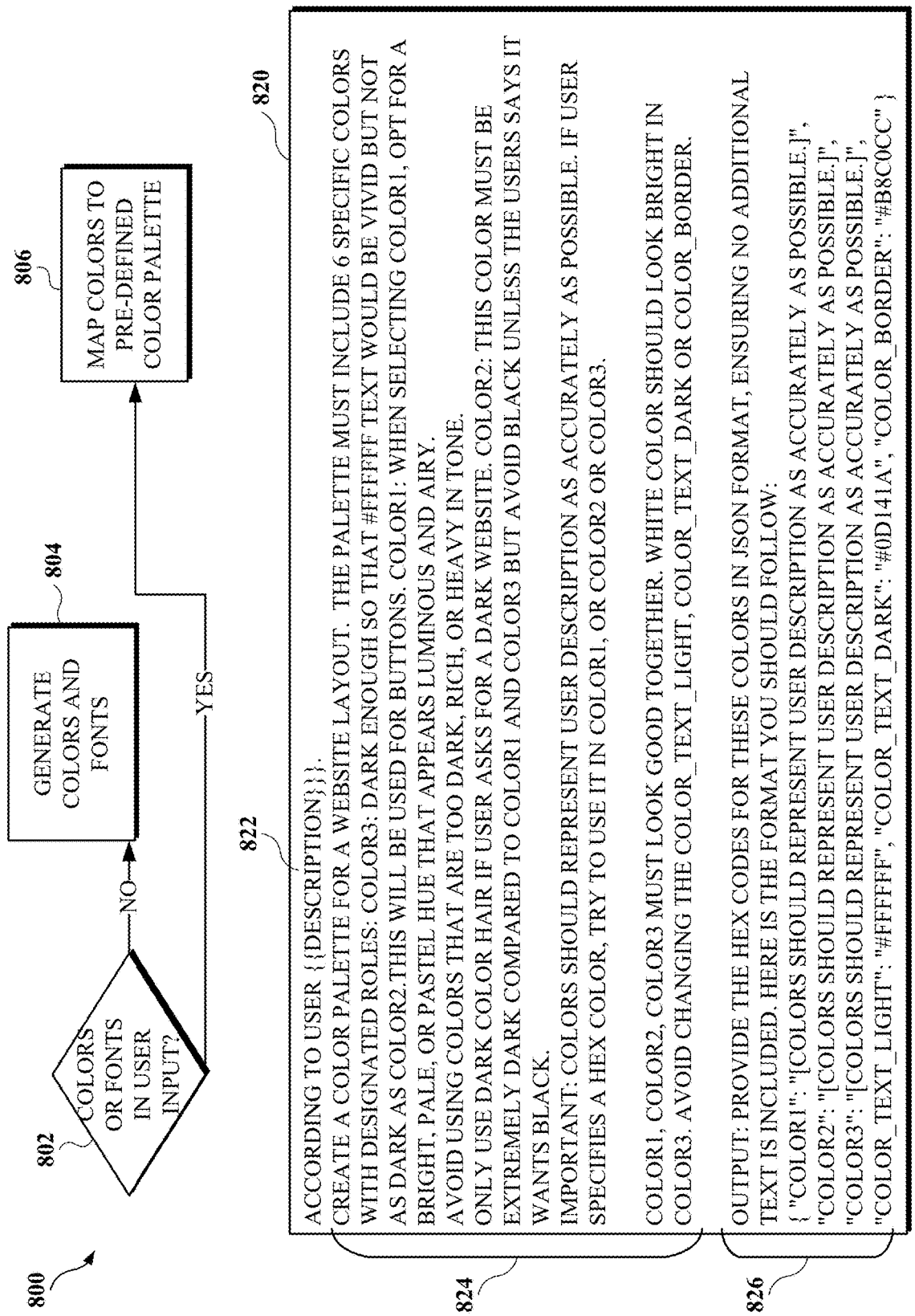
FIG. 8 illustrates operations of the color and fonts generation service of FIG. 5.

The color and fonts generation service 508 interfaces with a dedicated color and fonts database 520 to establish the website's visual identity. When processing explicit user preferences, the color and fonts generation service 508 uses prompts to direct the language model 514 to map these to professionally curated color palettes and typography combinations. In cases where preferences are not specified, the color and fonts generation service 508 generates default styles aligned with industry best practices and current design trends, ensuring visual harmony and accessibility compliance. FIG. 8 illustrates operations of the color and fonts generation service 508.

The image selection service 510 uses the images database 522 to facilitate image search. The image selection service 510 processes user input through the language model 514 to generate contextually relevant search keywords, which are then converted into vector embeddings. Unlike conventional image search approaches that vectorize the visual content of images directly, the image selection service 510 uses a text-based approach to image representation. Each image in the images database 522 is first converted into a detailed textual description using a visual language model (VLM), capturing its key features and context. These textual descriptions are then embedded into vector representations, enabling contextual matching based on semantic meaning rather than visual features.

When suitable images are not found in the images database 522, the image selection service 510 can utilize image generation models to create custom visuals that match the website's requirements (e.g., the website description and/or type). These generated images may undergo the same text-based processing-conversion to textual descriptions via VLM followed by vector embedding-before being stored in the database for potential future use.

Additionally, the image selection service 510 may expand its search to external media APIs to source supplementary images or videos when needed. Media content obtained through external APIs may undergo the same text-based processing workflow to maintain consistent search capabilities across all sources. This multi-source approach-combining database search, image generation, and external API access-ensures the service can provide appropriate visual content for any website requirement while maintaining the benefits of text-based semantic matching.

In some implementations, the image selection service 510 may implement a dual-embedding approach to image representation. Vector representations are generated by combining two distinct types of features: 1) Visual and semantic features extracted automatically through convolutional neural networks (CNNs), including both low-level characteristics (color distributions, textures, edges, shapes) and high-level elements (objects, scenes, people, activities, environments); and 2) Human-provided textual descriptions that describe what appears in the image, such as "A modern office space with large windows, four people working at desks" or "A close-up of coffee beans on a wooden table with morning sunlight." Using such a dual representation enables for more nuanced image matching by leveraging both the comprehensive visual analysis from CNNs and the website-focused contextual guidance from human descriptions.

A re-ranking algorithm may also be performed so that the most contextually appropriate images are prioritized based on both content relevance and visual coherence with the overall design scheme. The re-ranking process involves multiple scoring components to ensure optimal image selection. For each candidate image, a similarity score is generated by comparing the website description against the image's textual description using semantic similarity metrics. Additionally, a relevance score is computed based on the visual feature descriptions extracted through computer vision analysis. These scores are then combined using a weighted algorithm to produce a final ranking that balances both semantic relevance and visual appropriateness. This multi-faceted scoring approach helps ensure that selected images are not only topically relevant but also visually cohesive with the website's intended aesthetic and purpose.

The website assembly service 512 orchestrates the integration of outputs from all other services into a unified website structure. The website assembly service 512 resolves potential conflicts in styling or layout, ensures consistent application of visual elements, and generates a comprehensive internal data structure that represents the complete website. This structure, stored in the websites database 516, maintains the hierarchical organization of all components including global styles, page layouts, sections, and individual elements with their respective properties and relationships. The website assembly service 512 is further described with respect to FIG. 11.

The services 500 may operate in a coordinated and parallel manner to optimize processing efficiency, specifically because these operations can function independently of one another. This parallel execution capability allows simultaneous generation of structure, content, styling, and image selection, significantly reducing overall website generation time. The language model 514 serves (e.g., can be considered to be) as a central intelligence hub, providing consistent natural language understanding and generation capabilities across all services while maintaining contextual relevance and professional quality throughout the generated website.

The modular architecture of these services enables scalable processing and facilitates independent updates or improvements to individual components without affecting the entire system. Each service maintains its own specialized database—the sections database 518, color and fonts database 520, images database 522, and websites database 516—for storing and retrieving relevant assets, templates, and generated content, ensuring efficient resource utilization and enabling rapid website generation while maintaining high quality standards and user satisfaction.

FIG. 6 illustrates examples of prompts usable by the user preferences extraction service 502 of FIG. 5. FIG. 6 includes a prompt 602 and a prompt 604 usable to prompt a large language model, such as the language model 514 of FIG. 5.

The prompt 602 directs the language model to analyze a provided website description to detect whether specific colors or font styles are mentioned. This prompt consists of three components: a website description input 606, analysis instructions 608, and an output format 610. The website description input 606 receives the user-provided content describing the website. The analysis instructions 608 guide the language model to identify mentions of specific colors or fonts within the description, returning Boolean values accordingly. The output format 610 directs the language model to structure the result into two fields: "isColorMentioned" and "isFontMentioned", indicating whether colors or fonts were specified.

The prompt 604 directs the language model to determine the most suitable website type for a user based on the provided website description and brand name. The prompt 604 includes five components: a supported website types input 612, a user description input 614, a brand name input 616, website type selection instructions 618, and an output format 620. The supported website types input 612 supplies a predefined list of website categories, which may also include descriptions each of predefined types. The user description input 614 and brand name input 616 are provided as user input and are used as context for the user's intended website. The website type selection instructions 618 direct the language model to analyze these inputs according to specific priority rules, such as categorizing as "online store" when e-commerce indicators are present. The output format 620 structures the selected website type in a standardized format for use by other system components.

Figure 7:
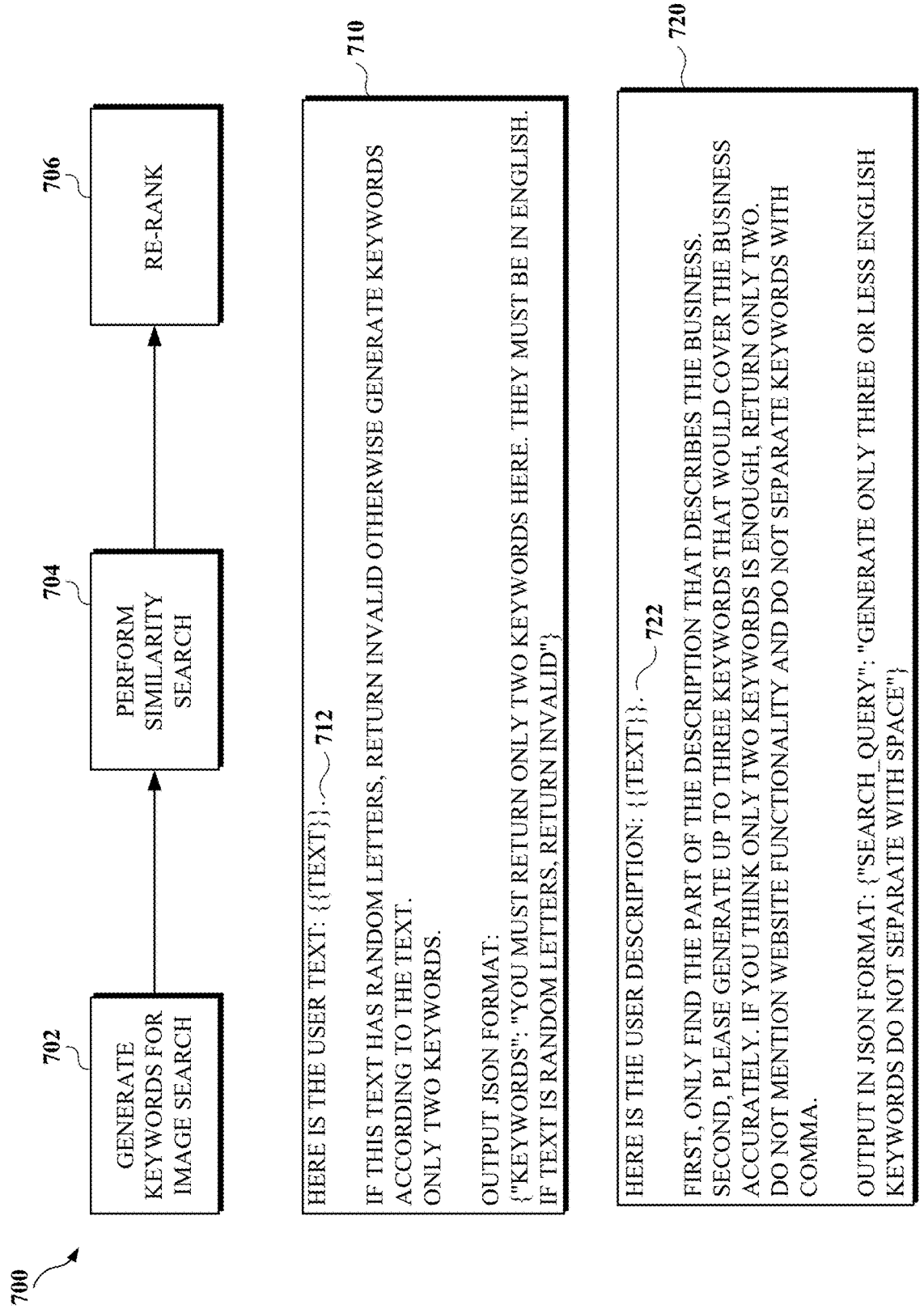
FIG. 7 illustrates operations of the image selection service of FIG. 5.

FIG. 7 illustrates operations of the image selection service 510 of FIG. 5. FIG. 7 includes a technique 700 that can be implemented by the image selection service 510 and prompts 710 and 720.

At 702, the technique 700 generates keywords for image search. This generation involves analyzing the user input to extract relevant keywords that align with the user's provided description or brand name. The extracted keywords are used to guide the subsequent image search. The technique 700 may utilize either prompt 710 or prompt 720 for this keyword generation, depending on the type of user input provided. In some implementations, the generated keywords may additionally or alternatively be used for image generation. As described herein, an AI model for image generation may be used to generate custom images At 704, the technique 700 performs a similarity search using the generated keywords. This search involves converting the keywords into vector embeddings using the language model and using these embeddings to search within the images database 522. The search identifies images that are most contextually appropriate based on the user's preferences and brand identity. At least one of the images may then be included in the website.

At 706, the technique 700 may optionally apply a re-ranking process to the retrieved images. This re-ranking leverages an image analysis infrastructure where images in the database have been pre-processed using computer vision techniques to generate detailed descriptions. These descriptions capture not only the image content but also compositional elements and visual characteristics. The technique 700 converts the user's website description into vector embeddings using the language model and compares these embeddings against the pre-processed image descriptions to determine contextual relevance.

The re-ranking process benefits from the system's unique approach to image vectorization, where each image in the image database, which may include over a million images, is represented, as described above, by dual embeddings: one derived from the image's content description and another from its compositional characteristics. This comprehensive representation enables more nuanced matching between user requirements and image selections. The re-ranking algorithm orders the initially retrieved images based on their similarity to both the semantic content of the website description and its implied visual requirements.

This two-stage approach-first searching by keyword embeddings and then re-ranking based on rich image descriptions-ensures that the images presented to the user are not only topically relevant but also stylistically appropriate for the website's context. For example, if a user's description suggests a professional business context, the re-ranking process would prioritize images with appropriate compositional elements and professional styling, even among topically relevant images.

In some implementations, where no images that meet a minimal similarity threshold are identified, the image selection service 510 can use an AI model, such as an AI model 212 of FIG. 2, to generate custom images based on the website description provided by the user.

The prompt 710 includes multiple components that guide the language model in keyword generation. A variable 712 includes the user-provided text to be analyzed. The prompt 710 first validates whether the input text contains meaningful content rather than random characters. If the text is valid, the language model is directed to extract exactly two relevant keywords in English. If the text contains random letters, the language model returns "invalid" in the specified JSON format.

The prompt 720 provides an alternative approach to keyword generation. A variable 722 includes the user-provided website description. The prompt 720 directs the language model to first isolate the portion of the description that specifically defines the business, filtering out any website functionality descriptions. From this filtered text, the language model generates up to three English keywords that accurately represent the business. The prompt specifies that if two keywords sufficiently capture the business description, only two should be returned. The results are formatted as a JSON object containing the generated keywords.

FIG. 8 illustrates operations of the color and fonts generation service 508 of FIG. 5. FIG. 8 includes a technique 800 that can be implemented by the color and fonts generation service 508 and a prompt 820 usable by the color and fonts generation service 508 to prompt a language model, such as the language model 514 of FIG. 5.

At 802, the technique 800 determines whether color or font preferences are specified in the user input. This determination involves analyzing the website description provided by the user (such as in the user input 511 of FIG. 5) for explicit mentions of colors or font styles. This determination can be made using the output from the prompt 602 of FIG. 6. If no preferences are specified, the technique 800 proceeds to 804. If preferences are specified, the technique 800 proceeds to 806.

At 804, when no specific preferences are provided, the technique 800 generates colors and fonts using default configurations. This generation uses prompts to direct the language model to recommend (e.g., generate) a suitable color scheme and font style that align with the user's provided description and industry standards. For example, the prompt 820 can be used to direct the language model to generate a color palette. The output of the prompt 820, in this example, includes a six-color palette with specific roles and relationships between the colors.

At 806, when preferences are specified in the user input, the technique 800 maps these preferences to pre-defined color palettes stored in the data storage 214. This mapping ensures consistency with established design standards while accommodating user specifications, resulting in a professional and visually harmonious color scheme.

When generating colors at 804, the technique 800 uses the prompt 820. The prompt 820 includes multiple components that guide the language model in generating a cohesive color palette. A description component 822 is a variable that includes the user-provided website description and defines the context and requirements for color generation. A rules component 824 specifies detailed requirements, usable by the language model, for three key colors: color1 must be bright, pale, or pastel with a luminous and airy appearance; color2 must be extremely dark while avoiding black unless specifically requested; and color3 must be dark enough to ensure white text is vivid while being lighter than color2. The rules component 824 also specifies that user-provided hex color codes should be incorporated where possible into color1, color2, or color3. The rules component 824 provide the language model with detailed requirements for the three key colors (color1, color2, color3) so that the language model can generate harmonious colors that align with the user's preferences. An output format component 826 indicates the format (e.g., content and structure) of the output to be generated by the language model. In this particular example, the language model is directed to generate a structured JSON object containing hex codes for all six colors in the palette.

Figure 9A:
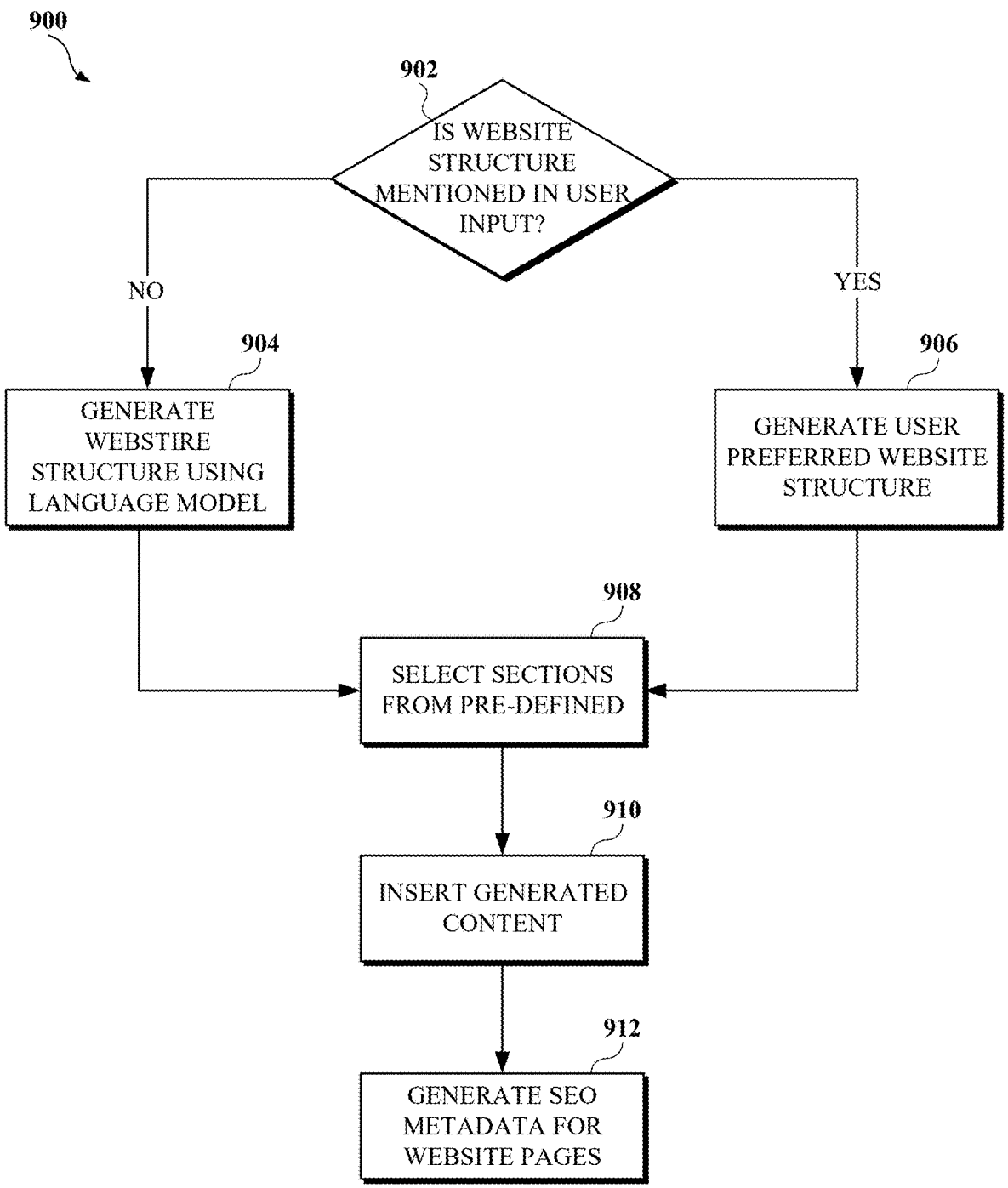
FIG. 9A includes is flowchart of a technique that can be implemented by the structure generation service of FIG. 5 for generating a website.

FIGS. 9A-9D illustrate operations of the structure generation service 504 of FIG. 5. FIG. 9A is flowchart of a technique 900 that can be implemented by the structure generation service 504 for generating a website. FIGS. 9B through 9D illustrate, respectively, prompts 920 through 940 usable by the service.

At 902, the technique 900 determines whether website structure preferences are specified in the user input (e.g., the website description and/or website type). The website structure defines a hierarchical arrangement including web pages, sections within those pages, and elements within those sections. For example, an "about us" page might contain sections for team member profiles and company history, with each section containing specific text and image elements. If no preferences are specified, the technique 900 proceeds to 904. If preferences are specified, the technique 900 proceeds to 906.

At 904, when no specific preferences are provided, the technique 900 generates website structure using the language model. The language model is prompted (e.g., directed) to analyze the user input to determine an appropriate website type (e.g., blog, portfolio, e-commerce). Based on the determined type, the technique 900 uses prompts (e.g., the prompt 920 of FIG. 9B) to generate appropriate page names and prompts (e.g., the prompt 930 of FIG. 9C) to determine appropriate sections for each page. This generation process considers the specific requirements of different website types—for example, ensuring e-commerce sections do not appear on portfolio websites.

At 906, when structural preferences are specified in the user input, the technique 900 extracts and implements these preferences while ensuring they conform to website design standards and best practices. The technique 900 maintains the hierarchical structure while incorporating user-specified elements. At 908, the technique 900 selects sections from a pre-defined set of designer-created sections stored in the data storage 214. These sections include various configurations—for example, a contact form section might have variants with the form positioned on the left with an image on the right, the form on the right with an image on the left, or a centered form with descriptive text below.

For each page, the language model analyzes both the website description and brand name to determine appropriate sections, matching them to the page's purpose. For example, an e-commerce website's pages would require product listing sections, while a restaurant website would need menu sections. The technique 900 uses prompts (e.g., the prompt 930 of FIG. 9C) to cause the language model to make these selections while maintaining visual coherence. The language model then assembles these sections in an optimized arrangement that considers both visual flow and user experience. This assembly process takes into account standard website design principles—for instance, placing key information "above the fold" (visible without scrolling) and maintaining a logical content hierarchy. The language model evaluates each section's content and purpose to determine an optimal ordering that enhances user engagement and website effectiveness. As already mentioned, the section selection and arrangement process operates in parallel with other generation processes, such as color selection and image search, to optimize overall website generation speed.

At 910, the technique 900 inserts generated content into the selected sections. Content generation is described with respect to FIG. 10. This generated content is customized for each section type while maintaining consistency with the overall website context and purpose. The content generation considers the specific requirements of each section—for example, generating appropriate product descriptions for product sections or team member bios for team sections.

At 912, the technique 900 generates SEO metadata for all website pages. More specifically, the technique 900 uses prompts (e.g., the prompt 940 of FIG. 9D) to cause the language model to generate the SEO metadata. As such, each website page can have appropriate tags, categories, keywords, and meta descriptions optimized for search engine visibility, contributing to the overall website's discoverability.

The prompt 920 of FIG. 9B includes multiple components that guide the language model in generating page names. A user data component 922 includes the website type and a user data component 924 includes the website description. A rules component 926 specifies requirements including using lowercase letters, avoiding underscores/slashes, and limiting names to one or two words. An output format 928 defines the structure for the language model's response.

The prompt 930 of FIG. 9C guides section selection for each webpage. That is, the prompt 930 directs the language model to generate sections for each webpage. A context component 932 provides the page names, which may be obtained using the prompt 920; and a description component 934 includes the website description. A rules component 936 specifies requirements for section selection and placement, including restrictions on hero sections and rules for specific page types. A hero section typically refers to a prominent, visually impactful section at the top of a webpage, often featuring a large image or video, a headline, and a call-to-action to capture user attention. The prompt 930 includes section list 938 variables that is populated with available, pre-defined sections (e.g., names and/or descriptions thereof). The section list 938 is populated from a data store, such as the sections database 518 of FIG. 5.

The prompt 940 of FIG. 9D causes the language model to generate SEO-related data. A content specification 942 defines the required SEO elements based on content 944. An output format 946 specifies the JSON structure for tags, category, keywords, and meta description, with field-specific requirements 948 such as character limits and language specifications.

FIG. 10 illustrates operations of the content generation service 506 of FIG. 5. FIG. 10 includes a technique 1000 that can be implemented by the content generation service 506, and a prompt 1010 usable by the content generation service 506.

At 1002, the technique 1000 collects elements that require content. These elements typically include placeholders within sections selected for the website, where specific textual content must be generated to complete the website's content structure. At 1004, the technique 1000 retrieves content via the language model. The technique 1000 uses the language model to generate appropriate textual content for each identified placeholder, ensuring the content aligns with the website's design and functionality.

The prompt 1010 includes multiple components that provide structured guidance to the language model. User data components 1012, 1014, and 1016 include website-specific information such as brand name, website type, and website description. A rules component 1018 specifies requirements for generating text for a specific page name (specified in a data component 1020) and section type (specified in a data component 1022), emphasizing that the content must seamlessly fit within the designated section type (specific in a data component 1024). A language specification 1026 indicates the required language for the generated content, ensuring it remains relevant to the business description. An output specification 1028 requires that the generated content strictly conform to a predefined format with specific keys (defined at keys 1030) to ensure proper integration with the website generation system.

Figure 11:
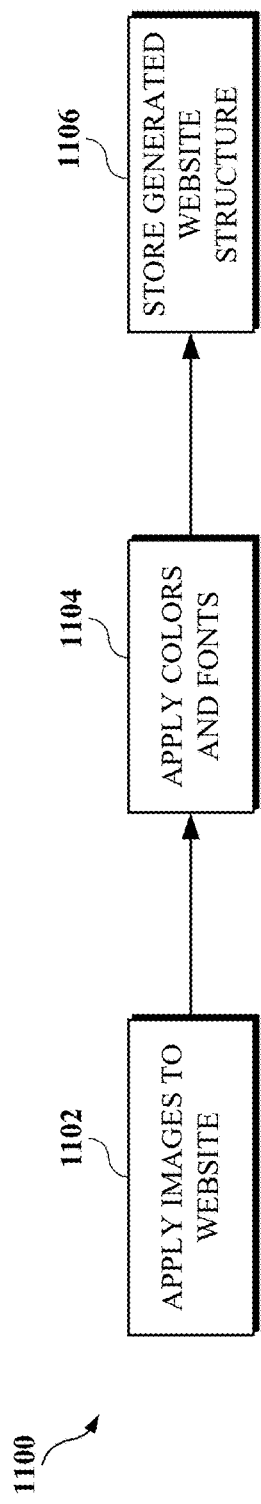
FIG. 11 is flowchart of a technique that can be implemented by the website assembly service of FIG. 5.

FIG. 11 is flowchart of a technique 1100 that can be implemented by the website assembly service 512 of FIG. 5. The technique 1100 assembles outputs from numerous services into a unified website structure. At 1102, the technique 1100 applies images to the website. More specifically, the technique 1100 integrates images selected by the image selection service 510 into the appropriate sections of the website structure, ensuring each image is properly positioned according to the section's requirements and the overall website layout. At 1104, the technique 1100 applies colors and fonts to the website. The technique 1100 incorporates the color schemes and typography selections generated by the color and fonts generation service 508, ensuring consistent visual styling across all website components.

At 1106, the technique 1100 stores the generated website structure. The technique 1100 organizes the website data into the hierarchical internal data structure described in FIG. 3. As described herein, this structure includes pages, sections, and elements, where each page includes multiple sections, and each section contains various elements that serve as building blocks for the website's content. Each page may possess specific properties unique to that page, while sections include their respective elements and properties such as color and font preferences. At the most granular level, each element has specific properties and positional data that define its placement and appearance within its parent section.

Figure 12:
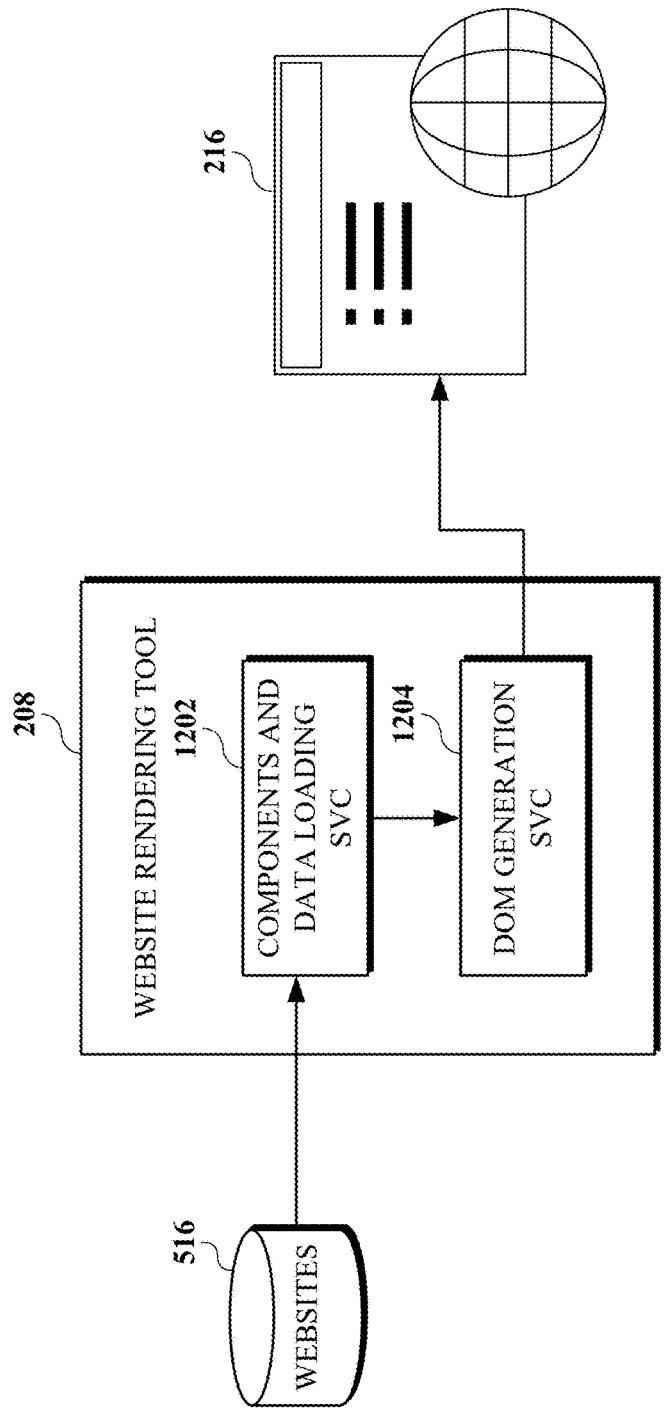
FIG. 12 is a block diagram illustrating the operations of the website rendering tool of FIG. 2.

FIG. 12 is a block diagram illustrating the operations of the website rendering tool 208 of FIG. 2. The website rendering tool 208 is shown as including a components and data loading service 1202 and a DOM generation service 1204. The website rendering tool 208 performs operations to convert the internal data structure of a generated website into a browser-compatible format.

The components and data loading service 1202 queries and retrieves website data from the websites database 516 of FIG. 5. Upon retrieving the data, the components and data loading service 1202 initializes necessary frameworks and loads website components into memory for processing. The DOM generation service 1204 receives the loaded data and framework from the components and data loading service 1202. Using this data, the DOM generation service 1204 constructs a DOM that represents the website in a format compatible with web browsers. This conversion from internal data structure to DOM ensures proper rendering of all website elements including layout, styling, and interactive components.

The DOM generation service 1204 outputs the constructed DOM to a web browser as the webpages 216 for rendering. The web browser then displays the website, enabling users to interact with and navigate through the generated website content. The browser-compatible format ensures that all website components—from basic text elements to complex interactive features—are properly displayed and functional within standard web browsers.

Figure 13:
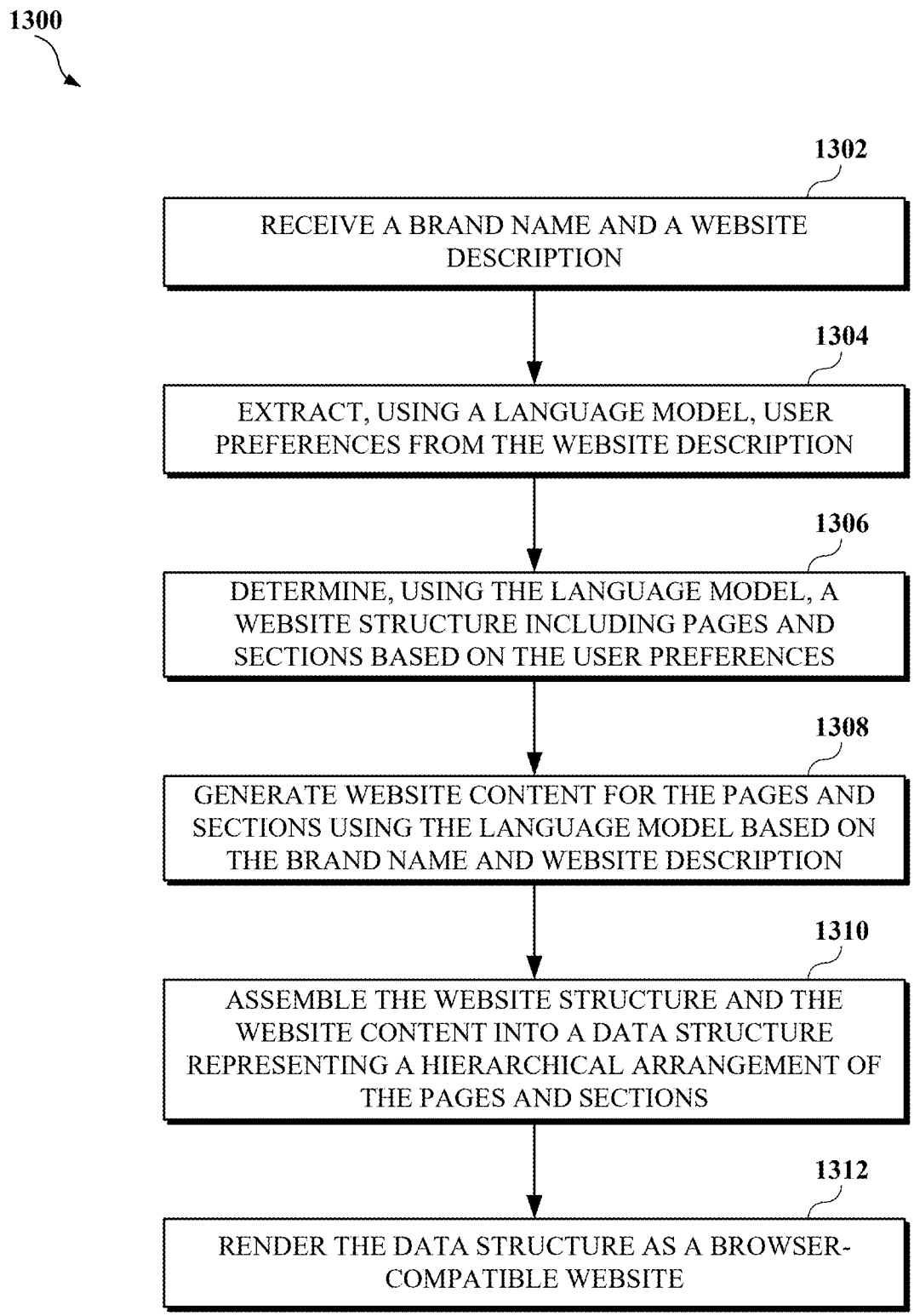
FIG. 13 is a flowchart of an example of a technique for website generation using language models.

To further describe some implementations in greater detail, reference is next made to examples of techniques which may be performed by or using a system for website generation using language models. FIG. 13 is a flowchart of an example of a technique 1300 for website generation using language models. The technique 1300 can be executed using computing devices, such as the systems, hardware, and software described with respect to FIGS. 1-12. The technique 1300 can be performed, for example, by executing a machine-readable program or other computer-executable instructions, such as routines, instructions, programs, or other code. The steps, or operations, of the technique 1300, or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations of the technique 1300 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, the technique 1300 receives a brand name and a website description. The brand name represents the business or organization identity, while the website description provides context about the website's purpose and requirements.

At 1304, the technique 1300 extracts user preferences from the website description using a language model. This extraction involves directing (e.g., prompting) the language model to analyze the description to identify explicit preferences for colors, fonts, layout, or content style, while also generating implicit preferences based on identified business characteristics. The technique 1300 determines, using the language model, a color scheme and typography, which includes font types, font sizes, and font weights. When determining the color scheme, the technique 1300 extracts any explicit color preferences and maps them to predefined color palettes via prompts to the language model. If no explicit preferences are provided, a color palette is selected based on the determined website type and brand name. Additionally, the technique 1300 analyzes (e.g., prompts the language model to analyze) the description to determine a primary language and handles content generation or translation accordingly when multiple languages are detected.

At 1306, the technique 1300 determines (e.g., prompts the language model to determine) a website structure including pages and sections based on the user preferences using the language model. This determination involves first identifying a website type based on the website description, then selecting available sections from a predefined section database based on that type, and arranging the sections into pages accordingly. The structure includes essential elements such as a primary banner section displaying the brand name at the top of the main page, at least one content section describing products or services, and a contact form section.

At 1308, the technique 1300 generates (e.g., prompts the language model to generate) website content for the pages and sections using the language model based on the brand name and website description. This involves identifying content placeholders within the sections and generating appropriate content (e.g., obtaining the appropriate content from the language model) for each placeholder. The technique 1300 may also generate SEO metadata for at least some of the pages based on the generated content and identified user preferences. As part of the content generation, the technique 1300 determines appropriate images based on user preferences. This image selection process involves generating keywords using the language model, converting them into vector embeddings, and performing a vector search to identify relevant images. Each image in the database is represented by dual embeddings-one for content description and another for visual features. The technique 1300 re-ranks the images based on similarity between the website description and image text descriptions, using a scoring system that combines similarity scores between descriptions and relevance scores based on visual features.

At 1310, the technique 1300 assembles the website structure and content into a data structure representing a hierarchical arrangement of the pages and sections. This structure includes page objects representing each website page, section objects representing sections within pages, and element objects representing individual elements within sections, with each element object including positioning data. The technique 1300 may monitor the completion status of structure determination, content generation, and image selection, ensuring assembly occurs only after all components are ready.

At 1312, the technique 1300 renders the data structure as a browser-compatible website. This rendering process involves loading website components based on the data structure, generating a DOM based on these components, and rendering the DOM in a web browser.

Some implementations are described below as numbered examples (Example 1, 2, 3, etc.). These examples are provided as examples only and do not limit the other implementations disclosed herein.

Example 1 is a method that includes receiving a brand name and a website description, extracting, using a language model, user preferences from the website description, determining, using the language model, a website structure including pages and sections based on the user preferences, generating website content for the pages and the sections using the language model based on the brand name and the website description, assembling the website structure and the website content into a data structure representing a hierarchical arrangement of the pages and the sections, and rendering the data structure as a browser-compatible website.

Example 2 is the method of Example 1 that further includes determining images based on the user preferences, wherein the images are assembled into the data structure.

Example 3 is the method of Example 2, wherein determining the images based on the user preferences includes generating, using the language model, keywords based on the website description; converting, using the language model, the keywords into vector embeddings; performing a vector search using the vector embeddings to identify relevant images in an image database, wherein the vector embeddings are compared to image embeddings, and wherein each image embedding includes a first embedding representing a content description of the image and a second embedding representing visual features of the image; and selecting at least one of the relevant images for inclusion in the website.

Example 4 is the method of Example 1, wherein determining the website structure includes determining, using the language model, a website type based on the website description; selecting available sections from a predefined section database based on the determined website type; and arranging the available sections into the pages based on the website type.

Example 5 is the method of Example 1, wherein generating the website content includes identifying content placeholders within the sections; generating, using the language model, content for each identified placeholder based on the brand name and the website description; and generating search engine optimization metadata for each page based on the content and identified user preferences.

Example 6 is the method of Example 1, wherein extracting the user preferences includes analyzing, using the language model, the website description to identify explicit user preferences for at least one of: colors, fonts, layout, or content style; and generating, using the language model, implicit preferences based on business characteristics identified in the website description.

Example 7 is the method of Example 1, wherein the data structure includes page objects representing each page of the website; section objects representing sections within each page; and element objects representing individual elements within each section, wherein each element object includes positioning data.

Example 8 is the method of Example 1, wherein rendering the data structure includes loading website components based on the data structure; generating a Document Object Model (DOM) based on the website components; and rendering the DOM in a web browser.

Example 9 is a system that includes a memory subsystem and processing circuitry, the processing circuitry configured to execute instructions stored in the memory subsystem to receive a brand name and a website description, extract, using a language model, user preferences from the website description, determine, using the language model, a website structure including pages and sections based on the user preferences, generate website content for the pages and the sections using the language model based on the brand name and the website description, assemble the website structure and the website content into a data structure representing a hierarchical arrangement of the pages and the sections, and render the data structure as a browser-compatible website.

Example 10 is the system of Example 9, wherein the processing circuitry is further configured to execute instructions stored in the memory subsystem to determine images based on the user preferences, wherein the images are assembled into the data structure.

Example 11 is the system of Example 10, wherein to determine the images based on the user preferences includes instructions to generate, using the language model, keywords based on the website description; convert, using the language model, the keywords into vector embeddings; perform a vector search using the vector embeddings to identify relevant images in an image database, wherein the vector embeddings are compared to image embeddings, and wherein each image embedding includes a first embedding representing a content description of the image and a second embedding representing visual features of the image; and select at least one of the relevant images for inclusion in the website.

Example 12 is the system of Example 9, wherein to determine the website structure includes instructions to determine, using the language model, a website type based on the website description; select available sections from a predefined section database based on the determined website type; and arrange the available sections into the pages based on the website type.

Example 13 is the system of Example 9, wherein to generate the website content includes instructions to identify content placeholders within the sections; generate, using the language model, content for each identified placeholder based on the brand name and the website description; and generate search engine optimization metadata for each page based on the content and identified user preferences.

Example 14 is the system of Example 9, wherein to extract the user preferences includes instructions to analyze, using the language model, the website description to identify explicit user preferences for at least one of: colors, fonts, layout, or content style; and generate, using the language model, implicit preferences based on business characteristics identified in the website description.

Example 15 is the system of Example 9, wherein the data structure includes page objects representing each page of the website; section objects representing sections within each page; and element objects representing individual elements within each section, wherein each element object includes positioning data.

Example 16 is the system of Example 9, wherein to render the data structure includes instructions to load website components based on the data structure; generate a Document Object Model (DOM) based on the website components; and render the DOM in a web browser.

Example 17 is one or more non-transitory computer-readable media storing instructions operable to cause one or more processors to perform operations for generating a website, the operations including receiving a brand name and a website description, extracting, using a language model, user preferences from the website description, determining, using the language model, a website structure including pages and sections based on the user preferences, generating website content for the pages and the sections using the language model based on the brand name and the website description, assembling the website structure and the website content into a data structure representing a hierarchical arrangement of the pages and the sections, and rendering the data structure as a browser-compatible website.

Example 18 is the non-transitory computer-readable media of Example 17, the operations further including determining images based on the user preferences, wherein the images are assembled into the data structure.

Example 19 is the non-transitory computer-readable media of Example 18, wherein determining the images based on the user preferences includes generating, using the language model, keywords based on the website description; converting, using the language model, the keywords into vector embeddings; performing a vector search using the vector embeddings to identify relevant images in an image database, wherein the vector embeddings are compared to image embeddings, and wherein each image embedding includes a first embedding representing a content description of the image and a second embedding representing visual features of the image; and selecting at least one of the relevant images for inclusion in the website.

Example 20 is the non-transitory computer-readable media of Example 17, wherein determining the website structure includes determining, using the language model, a website type based on the website description; selecting available sections from a predefined section database based on the determined website type; and arranging the available sections into the pages based on the website type.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments or implementations.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments or implementation, it is to be understood that the disclosure is not to be limited to the disclosed embodiments and implementation but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for generating a website, comprising:
   receiving a brand name and a website description;
   extracting, using a language model, user preferences from the website description;
   determining, using the language model, a website structure including pages and sections based on the user preferences, wherein determining the website structure comprises:
       determining, using the language model, a website type based on the website description;
       selecting available sections from a predefined section database based on the website type; and
       arranging the available sections into the pages based on the website type;
   generating website content for the pages and the sections using the language model based on the brand name and the website description;
   assembling the website structure and the website content into a data structure representing a hierarchical arrangement of the pages and the sections; and
   rendering the data structure as a browser-compatible website.

2. The method of claim 1, further comprising:
   determining images based on the user preferences, wherein the images are assembled into the data structure.

3. The method of claim 2, wherein determining the images based on the user preferences comprises:
   generating, using the language model, keywords based on the website description;
   converting, using the language model, the keywords into vector embeddings;
   performing a vector search using the vector embeddings to identify relevant images in an image database,
       wherein the vector embeddings are compared to image embeddings, and
       wherein each image embedding includes a first embedding representing a content description of the each image and a second embedding representing visual features of the each image; and selecting at least one of the relevant images for inclusion in the website.

4. The method of claim 1, wherein generating the website content comprises:

identifying content placeholders within the sections;

generating, using the language model, content for each identified placeholder based on the brand name and the website description; and generating search engine optimization metadata for each page based on the content and identified user preferences.

5. The method of claim 1, wherein extracting the user preferences comprises:

analyzing, using the language model, the website description to identify explicit user preferences for at least one of: colors, fonts, layout, or content style; and generating, using the language model, implicit preferences based on business characteristics identified in the website description.

6. The method of claim 1, wherein the data structure comprises:

page objects representing each page of the website;

section objects representing sections within each page; and element objects representing individual elements within each section, wherein each element object includes positioning data.

7. The method of claim 1, wherein rendering the data structure comprises:

loading website components based on the data structure;

generating a Document Object Model (DOM) based on the website components; and rendering the DOM in a web browser.

8. A system for generating a website, comprising:

a memory subsystem; and processing circuitry, the processing circuitry configured to execute instructions stored in the memory subsystem to:

receive a brand name and a website description;

extract, using a language model, user preferences from the website description;

determine, using the language model, a website structure including pages and sections based on the user preferences, wherein to determine the website structure comprises instructions to:

determine, using the language model, a website type based on the website description;

select available sections from a predefined section database based on the website type; and arrange the available sections into the pages based on the website type;

generate website content for the pages and the sections using the language model based on the brand name and the website description;

assemble the website structure and the website content into a data structure representing a hierarchical arrangement of the pages and the sections; and render the data structure as a browser-compatible website.

9. The system of claim 8, wherein the processing circuitry further configured to execute instructions stored in the memory subsystem to:

determine images based on the user preferences, wherein the images are assembled into the data structure.

10. The system of claim 9, wherein to determine the images based on the user preferences comprises instructions to:

generate, using the language model, keywords based on the website description;

convert, using the language model, the keywords into vector embeddings;

perform a vector search using the vector embeddings to identify relevant images in an image database, wherein the vector embeddings are compared to image embeddings, and wherein each image embedding includes a first embedding representing a content description of the each image and a second embedding representing visual features of the each image; and select at least one of the relevant images for inclusion in the website.

11. The system of claim 8, wherein to generate the website content comprises instructions to:

identify content placeholders within the sections;

generate, using the language model, content for each identified placeholder based on the brand name and the website description; and generate search engine optimization metadata for each page based on the content and identified user preferences.

12. The system of claim 8, wherein to extract the user preferences comprises instructions to:

analyze, using the language model, the website description to identify explicit user preferences for at least one of: colors, fonts, layout, or content style; and generate, using the language model, implicit preferences based on business characteristics identified in the website description.

13. The system of claim 8, wherein the data structure comprises:

page objects representing each page of the website;

section objects representing sections within each page; and element objects representing individual elements within each section, wherein each element object includes positioning data.

14. The system of claim 8, wherein to render the data structure comprises instructions to:

load website components based on the data structure;

generate a Document Object Model (DOM) based on the website components; and render the DOM in a web browser.

15. One or more non-transitory computer readable media storing instructions operable to cause one or more processors to perform operations for generating a website, the operations comprising:

receiving a brand name and a website description;

extracting, using a language model, user preferences from the website description;

determining, using the language model, a website structure including pages and sections based on the user preferences, determining the website structure comprises:

determining, using the language model, a website type based on the website description;

selecting available sections from a predefined section database based on the website type; and arranging the available sections into the pages based on the website type;

generating website content for the pages and the sections using the language model based on the brand name and the website description;

assembling the website structure and the website content into a data structure representing a hierarchical arrangement of the pages and the sections; and rendering the data structure as a browser-compatible website.

16. The one or more non-transitory computer readable media of claim 15, the operations further comprising:

determining images based on the user preferences, wherein the images are assembled into the data structure.

17. The one or more non-transitory computer readable media of claim 16, wherein determining the images based on the user preferences comprises:

generating, using the language model, keywords based on the website description;

converting, using the language model, the keywords into vector embeddings;

performing a vector search using the vector embeddings to identify relevant images in an image database,
wherein the vector embeddings are compared to image embeddings, and
wherein each image embedding includes a first embedding representing a content description of the each image and a second embedding representing visual features of the each image; and selecting at least one of the relevant images for inclusion in the website.

18. The one or more non-transitory computer readable media of claim 15, wherein extracting the user preferences comprises:

analyzing, using the language model, the website description to identify explicit user preferences for at least one of: colors, fonts, layout, or content style; and generating, using the language model, implicit preferences based on business characteristics identified in the website description.

19. The one or more non-transitory computer readable media of claim 15, wherein the data structure comprises:

page objects representing each page of the website;

section objects representing sections within each page; and element objects representing individual elements within each section, wherein each element object includes positioning data.

20. The one or more non-transitory computer readable media of claim 15, wherein rendering the data structure comprises:

loading website components based on the data structure;

generating a Document Object Model (DOM) based on the website components; and rendering the DOM in a web browser.

* * * * *